Dec. 29, 1964    B. H. SHINN    3,163,209
HEAT STORAGE UNIT
Filed June 7, 1960    2 Sheets-Sheet 1

INVENTOR
BYRON H. SHINN
BY Charles A. Warren
ATTORNEY 3,163,209
HEAT STORAGE UNIT
Byron H. Shinn, Bolton, Conn., assignor to United Aircraft Corporation, East Hartford, Conn., a corporation of Delaware
Filed June 7, 1960, Ser. No. 34,588
10 Claims. (Cl. 165—83)

The present invention relates to a heat storage unit which might have utility, for example, in a space power system.

One arrangement for storing heat is to deliver the heat to a heat absorbing fluid in a container with the heat later released to a transfer fluid passing through coils within the heat absorbing fluid in the container. Certain materials, such as lithium hydride, have a high heat absorption especially where the selected temperature for the material is such that the hydride is alternatively melted or solidified at least in part in the alternate storing and release of heat. One feature of the invention is a container particularly adapted for use as a heat storage unit in that it will expand to accommodate changes in the dimension of the fluid therein resulting from the temperature changes in the fluid. Another feature is the location of this container within a surrounding pressurized container so that the inner container will follow the changes in dimension of the material therein.

One feature of the invention is an arrangement of heating coils within the container so that the coils will be substantially uniformly spaced within the container as the latter changes in dimension. Another feature is the use of rectangular or flat-sided tubing for the coils in order to increase the heat exchange area and to minimize stresses on the tube as the heat absorbing material begins to solidify around the tubes during the release of heat.

Other features and advantages will be apparent from the specification and claims, and from the accompanying drawings which illustrate an embodiment of the invention.

Figure 1:
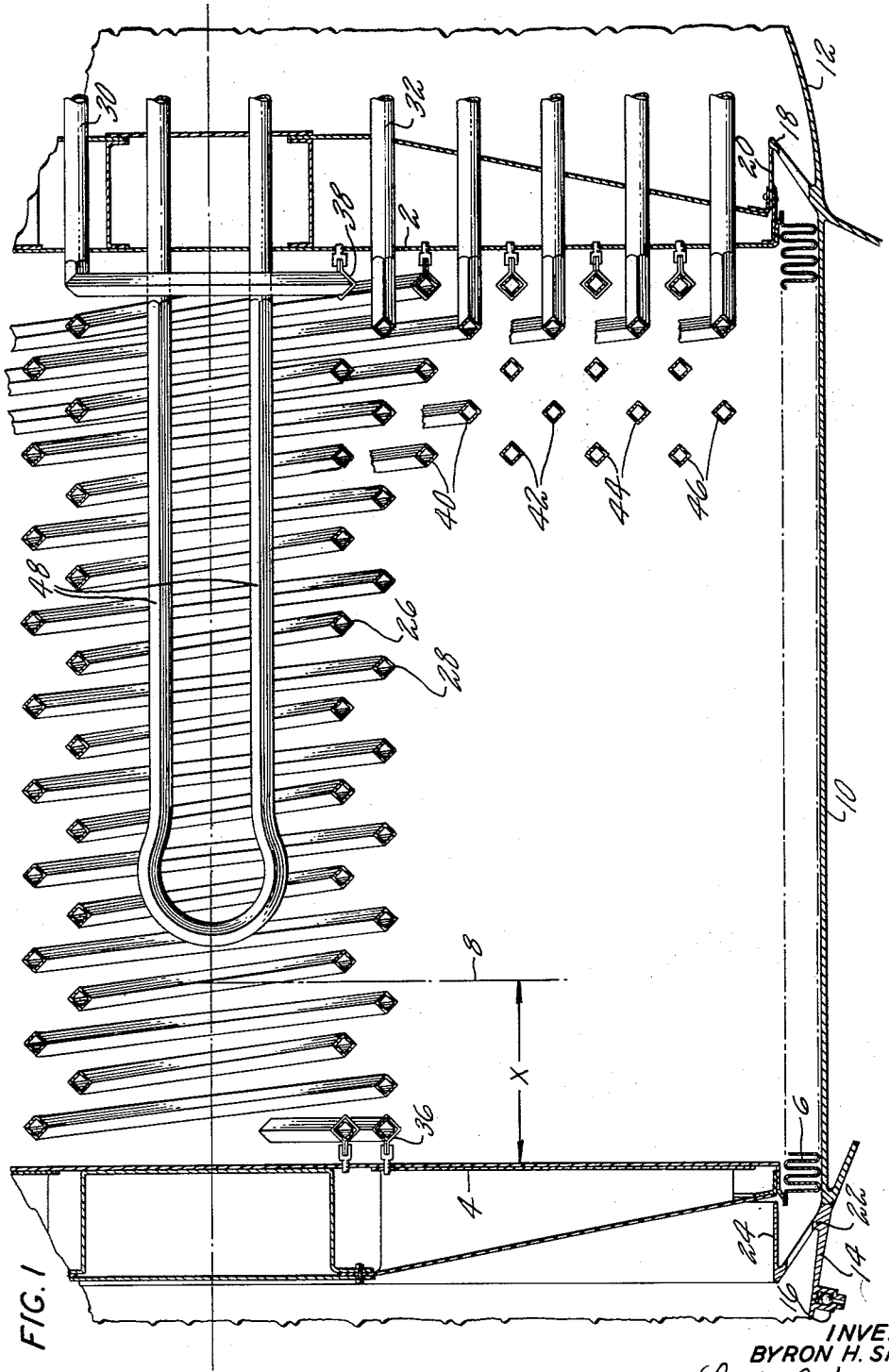
FIG. 1 is a fragmentary longitudinal sectional view through a heat storage unit.
Figure 2:
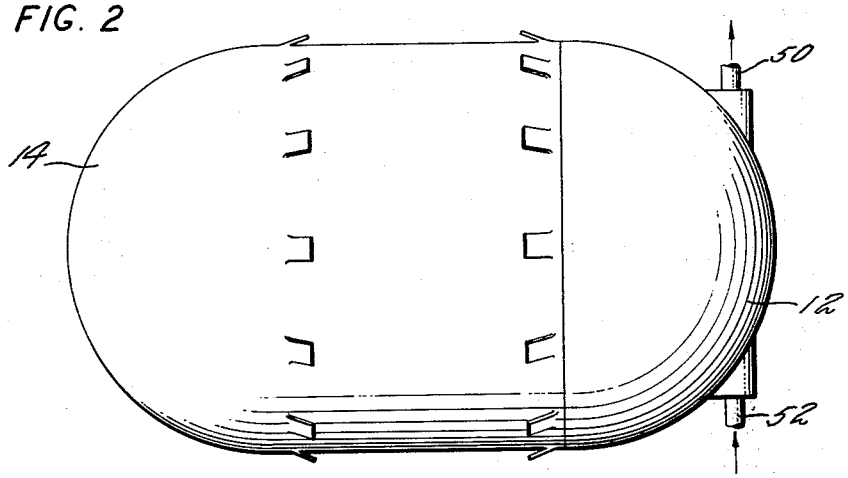
FIG. 2 is an elevation of the unit.

Referring first to FIG. 1, the unit includes a chamber for the heat storing fluid having a fixed end wall 2 and a movable end wall 4, these walls being fabricated from sheet material and reinforced, as shown. The container has a side wall 6 in the form of a bellows attached to the opposite end walls 2 and 4 at their periphery and adapted to contract or expand axially as the movable end wall 4 moves between its expanded position shown in full lines, and its contracted position shown by the dot-dash line 8 representing the inner position of the end wall. The movable end wall and expansible side wall result in a chamber which is endwise or axially expansible, as will be apparent.

This container is filled with a material which has high heat absorption capacity, one example being lithium hydride and the operating temperatures for the storage device are so selected that the lithium hydride is liquid at the higher temperature and is solidified, at least in part, at the lower temperature. This material has a high thermal expansion which necessitates the extreme changes in dimension represented by the difference between the full line position of the end wall 4 and the line 8 representing the inner position.

The fluid container is surrounded by another container having a cylindrical side wall 10 just outside of and spaced from the side wall 6. This wall guides the movable end wall 4 and the expandable side wall 6. Domed end walls 12 and 14 at opposite ends of the cylindrical wall 10 extend in spaced relation to the end walls 2 and 4 and provide with the wall 10 a space or outer container for pressurizing by an inert gas. This gas may be admitted through a gas inlet 16.

The end wall 2 is supported in fixed relation to the surrounding container by an inwardly projecting flange 18 which is attached to the end wall 2 adjacent its periphery by a short cylinder 20 integral with the flange 18. Adjacent the movable end wall 4, the outer container has a flange 22 similar to the flange 18 which carries a short cylinder 24 in a position to engage with a portion of the end wall 4 adjacent its periphery thereby to limit the expanding movement of the inner container.

Within the inner container are located a plurality of coils of tubes through which a fluid is circulated and by which heat is delivered to the fluid within the inner container or withdrawn therefrom. The sets of tubes are arranged in pairs and only one pair of tubes is shown in detail. This pair of tubes includes an inner helically arranged tube 26 and a surrounding helically arranged tube 28. These tubes have the same "hand" or twist, that is to say in the arrangement shown, the two helical coils are left-handed coils. One end of each of these coils terminates in an axially extending end which projects axially through the fixed end wall 2. Thus, the inner coil 26 has a projecting integral end or pipe 30 and the outer helical coil 28 has the pipe 32.

Figure 3:
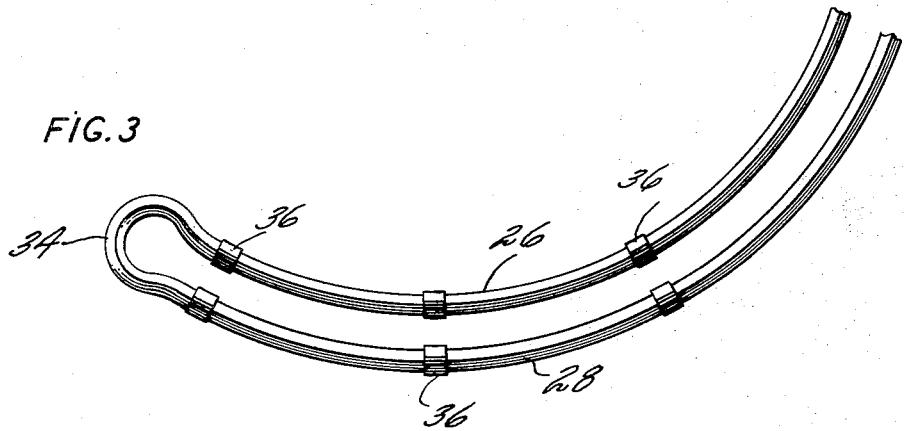
FIG. 3 is a fragmentary view of a detail.

At the opposite end of the coils 26 and 28, adjacent the end wall 4, they are connected by an integral loop 34, FIG. 3, which is located substantially in a plane at right angles to the axes of the helices, as shown. Suitable clips 36 attach these ends of the coils 26 and 28 to the movable end wall 4 and other clips 38 hold the opposite ends of the helices in fixed relation to the end wall 2. Thus, the two coils 26 and 28 form a continuous loop for the flow of cooling or heating fluid, the fluid being admitted, for example, through the pipe 30 and discharging through the pipe 32. The clips 36 and 38 are attached as by brazing or welding to the end walls.

Also within the inner container are additional pairs of helical coils arranged in a manner similar to the coils 26 and 28 and in surrounding coaxial relation thereto. Thus, a pair of helical coils 40 surround and are positioned externally of the coil 28 with the tubes in uniformally spaced relation in a radial direction. Another pair of helical coils 42 surround the coils 40 and other pairs 44 and 46 are similarly arranged such that the coil will be uniformally spaced apart in a radial direction and successive turns of each coil are uniformally spaced apart in an axial direction. Obviously, the coils of each pair of coils 40, 42, 44 and 46 will be interconnected at their ends adjacent to the movable wall 4 in a manner similar to the coils 26 and 28. One material to be pumped through these coils may be liquid sodium.

By mounting the end coils securely to the end walls as by the clips 36 and 38, the entire coil will be contracted as the container diminishes in length and will expand as the container expands so that the successive turns of each coil will always be in substantially uniform spaced relation to each other. The central space in the inner container within the innermost coil 26 may have an axially extending loop 48 for cooling and heating the fluid in this area of the container.

Each of the tubes is non-circular, such as flat-sided or polyangular, being rectangular in the arrangement shown, so that as the surrounding fluid solidifies around the coils it will partially collapse the tubing without damage thereto. In this way, the pressure internally and externally in the tube remains substantially the same and the tubing may be made of very thin-walled material for better heat transfer. Furthermore, the rectangular section for the tubing provides greater heat transfer area than a round tube for the same weight of fluid within the tube. Furthermore, the corners of the tubes being relatively sharp will move with less resistance through the viscous or partially crystallized heat storing fluid much like the prow of an icebreaker. It will be understood that the several coils may be interconnected in series to distribute the heat energy as uniformly as possible through the container. The coils within the container may have connections to an outlet and inlet 50 and 52 in the end cap 12.

It is to be understood that the invention is not limited to the specific embodiment herein illustrated and described, but may be used in other ways without departure from its spirit as defined by the following claims.

I claim:

1. In a heat storage device the combination with an endwise expansible chamber having therein a heat receiving material which is alternately liquid or somewhat solid as more or less heat is stored therein, said chamber being defined by relatively movable end walls and an expansible side wall, an endwise expansible coil in said container for the circulation of fluid therethrough, said coil being attached to at least one of said end walls and being for at least a portion of its length of rectilinear cross section to move more readily through the heat receiving material, the opposite corners of the rectilinear cross section extending in a direction endwise of the chamber.

2. In a heat storage device as in claim 1 in which the sides of the tubing are substantially flat and opposite corners extend in the direction of the movement of the coil within the heat receiving material in the container.

3. A storage device as in claim 1 in which one end of the container is movable axially with respect to the other in which the coil is attached to the end walls such that a portion thereof moves with the movable end wall and in which the opposite corners of the tubing project axially of the container.

4. A heat storage device including means defining a closed chamber adapted to contain a high heat absorptive material that operates in a temperature range such that the material is at times liquid and at times at least partially solid, being thereby subject to substantial changes in dimension, said chamber having end walls one of which is axially movable relative to the other, and an axially expansible side wall connecting said end walls to enclose the material therein, and a number of helically arranged coils of tubes located within the chamber, said coils being positioned axially within the chamber and being axially extensible, said tubes receiving a circulating fluid for delivering heat to or receiving heat from the material, said coils extending between and attached to the end walls and being adapted to extend axially as the movable end wall moves away from the other wall.

5. A storage device as in claim 4 in which one end wall is fixed and guide means surround and engage with the side wall to guide the movement of the side wall and the movable end wall, said guide means engaging said movable end wall axially to limit its axial movement.

6. A storage device as in claim 4 in which the helically arranged coils are arranged in pairs with the coils of each pair interconnected adjacent the movable end wall to form loops, the ends of the coils at the fixed end wall extending through and being fixed in said fixed end wall.

7. A storage device as in claim 4 in which a cylinder surrounds the side wall in engagement therewith for guiding said side wall, said cylinder being attached to one end wall and having stop means engaging the other end wall to limit the relative axial movement between the end walls.

8. A heat storage device as in claim 7 in which said cylinder has closed end walls attached thereto to form an outer container.

9. A heat storage device having a fixed end wall, an endwise expansible side wall, and a movable end wall at the end of the expansible side wall remote from the fixed end wall, said end walls and the expansible side wall extending therebetween forming a closed container, tubular coils extending between said end walls, guide means surrounding said expansible side wall and extending between the end walls to guide the expansive movement of the side wall, and stop means carried by said guide means and engaging said movable end wall for limiting the endwise movement of said movable end wall.

10. A storage device as in claim 9 in which the side wall is in the form of an expanding bellows and is attached at opposite ends to the end walls.

References Cited in the file of this patent

UNITED STATES PATENTS

| | | |
|---|---|---|
| 382,546 | Moore | May 8, 1888 |
| 910,192 | Grouvelle et al. | Jan. 19, 1909 |
| 1,410,561 | Forseille | Mar. 28, 1922 |
| 1,604,197 | Rushmore | Oct. 26, 1926 |
| 1,799,081 | Blomqvist | Mar. 31, 1931 |
| 1,965,553 | Lear | July 4, 1934 |
| 2,050,465 | Salvo et al. | Aug. 11, 1936 |
| 2,336,879 | Mekler | Dec. 14, 1943 |
| 2,396,235 | Arvins et al. | Mar. 12, 1946 |
| 2,594,761 | Fletcher et al. | Apr. 29, 1952 |
| 2,653,799 | Stahn et al. | Sept. 29, 1953 |
| 2,878,012 | Crites | Mar. 17, 1959 |
| 2,888,251 | Dalin | May 26, 1959 |
| 2,916,264 | Rhodes | Dec. 8, 1959 |
| 2,988,335 | Disinger et al. | June 13, 1961 |